(12) United States Patent
Yu et al.

(10) Patent No.: US 9,986,468 B2
(45) Date of Patent: May 29, 2018

(54) REMOVE TCP DEADLOCK CAUSED BY WIRELESS DEVICE CROSS TECHNOLOGY HANDOVER

(71) Applicant: Futurewei Technologies, Inc., Plano, TX (US)

(72) Inventors: Jing Yu, San Diego, CA (US); Yumin Tang, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 137 days.

(21) Appl. No.: 15/074,475

(22) Filed: Mar. 18, 2016

(65) Prior Publication Data

US 2017/0272984 A1  Sep. 21, 2017

(51) Int. Cl.
*H04W 36/00* (2009.01)
(52) U.S. Cl.
CPC ............... *H04W 36/0022* (2013.01)
(58) Field of Classification Search
CPC .................................................. H04W 36/0022
See application file for complete search history.

(56) References Cited

U.S. PATENT DOCUMENTS

| 7,813,772 | B2 | 10/2010 | Camp, Jr. et al. | |
| 8,537,822 | B2* | 9/2013 | Montemurro | H04L 63/20 370/351 |
| 9,137,655 | B2 | 9/2015 | Richardson et al. | |
| 2008/0014957 | A1* | 1/2008 | Ore | H04W 36/0088 455/452.1 |
| 2011/0164589 | A1* | 7/2011 | Lee | H04W 36/02 370/331 |
| 2011/0188390 | A1* | 8/2011 | Kwag | H04L 43/00 370/252 |
| 2013/0196643 | A1 | 8/2013 | Medapalli et al. | |

FOREIGN PATENT DOCUMENTS

| CN | 101682346 | 3/2010 |
| CN | 103999536 | 8/2014 |

OTHER PUBLICATIONS

"International Application No. PCT/CN2016/090562, International Search Report dated Dec. 8, 2016", (Dec. 8, 2016), 4 pgs.
Wu, Xiuchao, et al., "TCP HandOff: A Practical TCP Enhancement for Heterogeneous Mobile Environments", IEEE Communications Society, (2007), 6 pgs.

\* cited by examiner

*Primary Examiner* — Hashim Bhatti
(74) *Attorney, Agent, or Firm* — Schwegman Lundberg & Woessner, P.A.

(57) ABSTRACT

A mobile device comprises physical layer circuitry including a transceiver configured to communicate information via the cellular communication network; a modem of the mobile device configured to: control communication according to a first cellular communication protocol standard; detect a change in the communication to a second cellular communication protocol standard different from the first cellular communication protocol standard; and communicate an indication of completion of the change in the cellular communication protocol standard; and a transport control protocol (TCP) layer of the mobile device configured to initiate transmission of three duplicate acknowledgment (ACK) packets according to the second cellular communication protocol standard in response to receiving the indication of completion of the change in the cellular communication protocol standard.

18 Claims, 3 Drawing Sheets

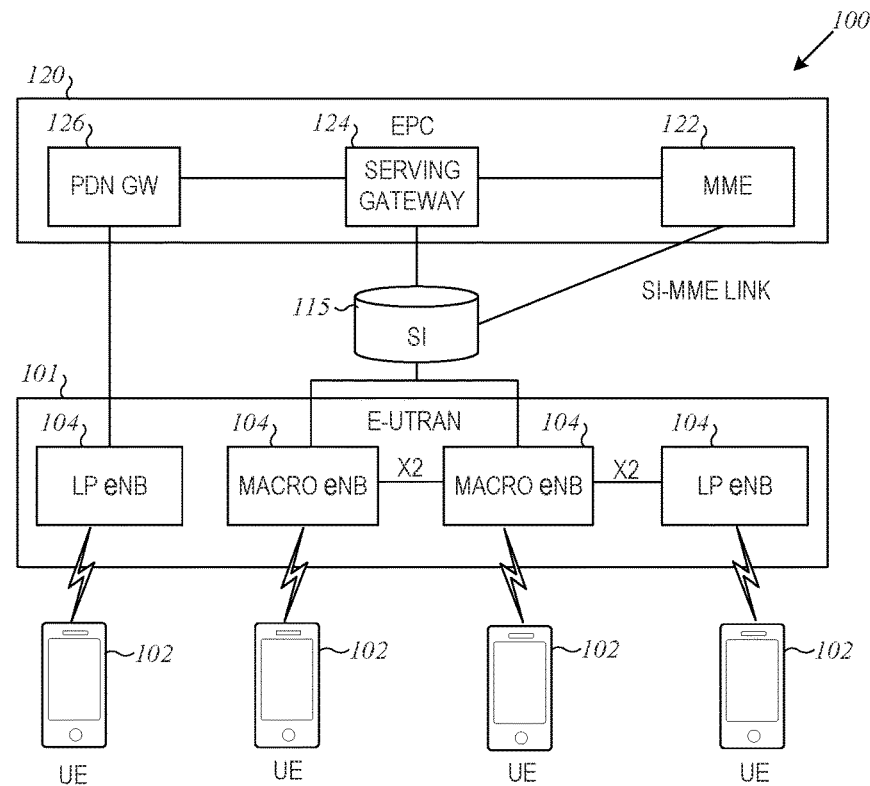
FIG. 1
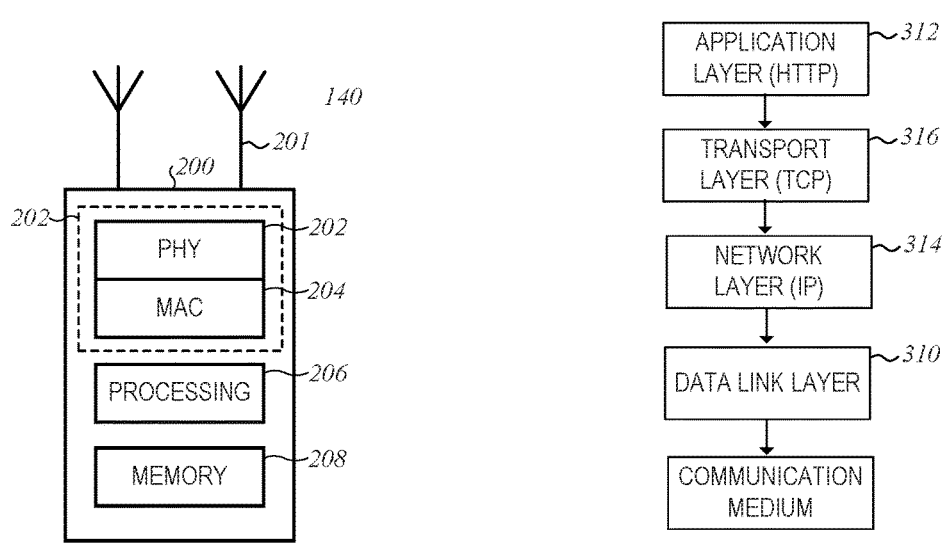
FIG. 2
FIG. 3

REMOVE TCP DEADLOCK CAUSED BY WIRELESS DEVICE CROSS TECHNOLOGY HANDOVER

BACKGROUND

Radio access networks can be used for delivering voice and data communications to user equipment such as a mobile cellular telephone or a smart phone. A cellular communication network includes fixed location transceivers distributed over land areas. Cell transceivers of the network may be included in cell towers to serve large land areas and cell transceivers may be arranged to serve smaller areas or to provide localized service such as within a building. The transceivers and the areas that they serve can be referred to as cells of the cellular network. User equipment (UE) refers to mobile equipment (e.g., a smart phone) that communicates using the network. UE may need to support multiple generations of cellular communication protocol standards (e.g., 2G, 3G, and 4G communication systems). Accommodating multiple standards with UE can place challenging demands on the UE.

SUMMARY

Mobile devices for radio access networks may need to change the communication technology during a communication session. The present subject matter relates to mobile devices, and in particular to quickly resolving problems that may arise due to a communication technology handover.

One example of a system for communication via a cellular communication network includes a transport control protocol (TCP) source device and a mobile device. The mobile device includes a modem and a TCP layer. The modem includes physical layer circuitry including a transceiver configured to communicate information via the cellular communication network. The modem is configured to: control communication according to a first cellular communication protocol standard; detect a change in the communication to a second cellular communication protocol standard different from the first cellular communication protocol standard; and communicate an indication of completion of the change in the cellular communication protocol standard. The TCP layer of the mobile device is configured initiate transmission of three duplicate acknowledgment (ACK) packets in response to receiving the indication of completion of the change in the cellular communication protocol standard.

A method example includes communicating information via a cellular communication network using a first cellular communication protocol standard; detecting, by a modem of the mobile device, a change in the communication to a second cellular communication protocol standard different from the first cellular communication protocol standard; communicating, from the modem to a TCP layer of the mobile device, an indication of completion of the change in the cellular communication protocol standard; and initiating, by the TCP layer in response to the indication of completion, transmission of three duplicate ACK packets.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIG. 1 shows an example of a portion of an end-to-end network architecture of an LTE network.

FIG. 2 is a functional block diagram of a mobile device.

FIG. 3 is an illustration of operating layers of a mobile device.

DETAILED DESCRIPTION

Figure 4:
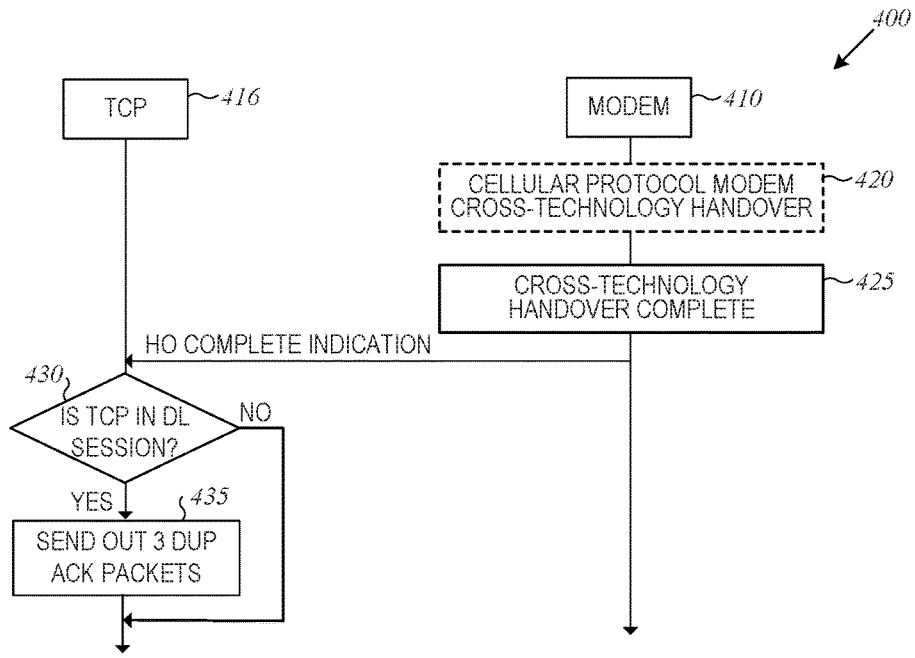
FIG. 4 is a flow diagram of an embodiment of a method of operating a mobile device.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 shows an example of a portion of an end-to-end network architecture of a long term evolution (LTE) network with various components of the network in accordance with some embodiments. The network 100 comprises a radio access network (RAN) (e.g., as depicted, the evolved universal terrestrial radio access network or E-UTRAN) 100 and the core network 120 (e.g., shown as an evolved packet core (EPC)) coupled together through an S1 interface 115 that provides delivery of user data between the RAN and EPC. For convenience and brevity, only a portion of the core network 120, as well as the RAN 100, is shown in the example. The core network 120 includes mobility management entity (MME) 122, serving gateway (serving GW) 124, and packet data network gateway (PDN GW) 126. The RAN includes enhanced node B's (eNBs) 104 for communicating with user equipment (UE) 102. The eNBs 104 may include macro eNBs and low power (LP) eNBs.

The MME is similar in function to the control plane of legacy serving general packet radio service (GPRS) Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 uses an SGi interface to communicate with the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate orthogonal frequency-division multiplexing (OFDM) communication signals with an eNB 104 over a multicarrier communication channel in accordance with an orthogonal frequency-division multiple access (OFDMA) communication technique. The OFDM signals may comprise a plurality of orthogonal subcarriers.

The SI interface 115 is the interface that separates the RAN 100 and the EPC 120. It is split into two parts: the SI-U, which carries traffic data between the eNBs 104 and the serving GW 124, and the SI-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

FIG. 2 illustrates a functional block diagram of a mobile device such as a UE device. In some embodiments, the mobile device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an internet of things (IoT) device (e.g., a smart sensor), or other device that may receive and/or transmit information wirelessly. In some embodiments, the mobile device 200 may include one or more of a keyboard, a display, a non-volatile memory port, multiple antennas, a graphics processor, an application processor, speakers, and other mobile device elements. The display may be an LCD screen including a touch screen.

Although the mobile device 200 is illustrated as having several separate functional elements, one or more of the functional elements may be combined and may be implemented by combinations of software-configured elements, such as processing elements including digital signal processors (DSPs), baseband processors, and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments of the mobile device 200 may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

The mobile device 200 may be suitable for use as any one or more of the UEs 102 illustrated in FIG. 1. The one or more antennas 201 utilized by the mobile device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $1/10$ of a wavelength or more.

The mobile device 200 includes a modem 210. The modem 210 may include physical layer (PHY) circuitry 202 for transmitting and receiving radio frequency electrical signals to and from one or more nodes of a radio access network such as eNBs 104 (FIG. 1) using one or more antennas 201. The PHY circuitry 202 may include circuitry for modulation/demodulation, upconversion/downconversion, filtering, amplification, etc. The modem 210 may also include medium access control layer (MAC) circuitry 204 for controlling access to the wireless medium and to configure frames or packets for communicating over the wireless medium. The mobile device 200 may also include processing circuitry 206 and memory 208 arranged to configure the various elements of the mobile device to perform the operations described herein. The memory 208 may be used to store information for configuring the processing circuitry 206 to perform the operations.

In some broadband multicarrier embodiments, eNBs may be part of a broadband wireless access (BWA) network communication network, such as a 3rd Generation Partnership Project (3GPP) Universal Terrestrial Radio Access Network (UTRAN), a Long-Term-Evolution (LTE) or a Long-Term-Evolution (LTE) communication network, a global system for mobile communications (GSM) network, a wideband code division multiple access (WCDMA) system, CDMA Evolution-Data Optimized (CDMA EVDO), CDMA-1x, a general packet radio service (GPRS), or an enhanced GPRS (EDGE).

FIG. 3 is an illustration of an embodiment of operating layers of a mobile device. The layers may be performed as one or more processes operating on one or more processing elements of the mobile device. The lower layer of the example includes a data link layer 310 that may be included in the modem. The upper layer is the application layer 312. Between the application and data link layers are a network or internet protocol (IP) layer 314 and a transport control protocol (TCP) layer 316. Information can be communicated to the mobile device using packets. The network layer 314 unpacks the packets and sends the payload as raw data to the upper layer. The upper layer sends data to the TCP layer if it determines that the data is included in TCP packets. In conventional mobile devices, there is no direct communication ability between the data link layer 310 and the TCP layer 316.

As explained previously, a mobile device may need to communicate using current communication technology as well as legacy technology. A challenge can arise if the mobile device experiences a handoff or handover between communication technologies. For example, the mobile device may need to change from a communication protocol standard associated with a fourth generation or 4G communication technology to communication protocol standard associated with a third generation or 3G communication technology. A handover between communication technologies can occur when the cell serving the mobile device changes, and the new serving cell has a different communication system technology than the previous serving cell. If one serving cell accommodates multiple communication technologies, the mobile device will typically communicate using the highest technology available by the cell.

Another situation in which a handover can occur is when the communication mode required by the mobile device changes. An example is a "circuit switch fall back" or CSFB. In current wireless communication technology, packet data service is provided using a packet switched (PS) method and voice data is provided using circuit switched (CS) method. In packet switching data is packetized in small blocks at the source, transmitted, and then reassembled at the destination. In circuit switching, the connection is typically a point-to-point connection, but more recently, voice data can be provided using packetized data if the mobile device and the cell support voice over LTE (VoLTE). If the one or both of the mobile device and the network supports LTE but does not support VoLTE, a technology handover needs to be made when the mobile device switches from transferring data to making a voice call. For example, if the mobile device is transferring data using LTE and then activates a voice call, the service technology will fall back (handover) from the LTE technology to a technology that supports both data (e.g., PS) and voice (e.g., CS), such as WCDMA or CDMA-1× in order to provide both data and voice services simultaneously. After the voice call is ended, the service technology will handover from the PS-CS supported technology back to LTE.

It is desirable for the user of a mobile device to be impacted as little as possible by the handover. However, the communication protocol standards associated with the different technologies can be quite different resulting in loss of data. For example, the data buffered in the lower layers of a protocol stack of the mobile device (e.g., a MAC layer) may have a different format from one technology to the other. The buffered data may not be included in the handover and may need to be retransmitted. Also, during the handover period, the source may be continuing to send data. Because the handover process is not complete the data may be discarded. If the handover process is relatively long, this can result in additional loss of a significant amount of data. The loss of data can result in a time delay noticeable by the user when the user wishes to switch between voice and data communications.

FIG. 4 is a flow diagram of an embodiment of a method 400 of operating a mobile device, such as mobile device 200 of FIG. 2. The mobile device includes a modem 410 and a TCP layer 416. Flow proceeds from top to bottom of the Figure. The modem 410 controls communication according to a first cellular communication protocol standard.

At 420, the modem 410 detects a change in the communication (e.g., during a communication session) from the first cellular communication protocol standard to a second cellular communication protocol standard different from the first cellular communication protocol standard. In some examples, the first communication protocol standard is a long term evolution (LTE) communication protocol standard, and the second cellular communication protocol standard includes one of WCDMA, CDMA Evolution-Data Optimized (CDMA EVDO), CDMA-1×, a general packet radio service (GPRS), or an enhanced GPRS (EDGE). In some examples, the first cellular communication protocol standard includes one of WCDMA, CDMA EVDO, CDMA-1×, GPRS, or EDGE, and the second cellular communication protocol includes an LTE communication protocol standard. In some examples, the modem 410 detects a change in communication between a communication protocol standard that includes WCDMA and a communication protocol standard that includes one of GPRS or EDGE. In some examples, the modem 410 detects a change in communication between a communication protocol standard that includes CDMA EVDO and a communication protocol standard that includes CDMA-1×.

The data transfer may be a download to the TCP layer 416 from the remote TCP source (e.g., a TCP server), not shown here. On remote data sending side, the remote TCP source has sent out several data packets. The outstanding data (the data sent out and acknowledged) has reached the maximum limit. The remote TCP source is waiting for the ACK packets from the mobile device to reduce the outstanding data in order to send out more data. During the handover, the data sent out using the first protocol standard are lost. The remote TCP source is waiting for the ACK packets lost data. On the mobile device side, the local TCP layer has sent ACK packets to the data it has received. It is waiting for the new data to come. Both sides are waiting for each other, the TCP data transfer falls into a TCP deadlock situation in which a conventional mobile device must wait for the remote TCP source to timeout before it retransmits the data. The remote TCP source starts an RTO timer when it sends data. An ACK packet from the mobile device will stop the RTO timer, and retransmission will start from the sequence next to the last (or latest) ACK packet. However, in case of TCP deadlock the RTO timer continues to run. When the RTO timer times out, the remote TCP source will retransmit the data package.

To reduce the waiting period associated with the TCP deadlock, the modem 410 detects the handover from the first cellular communication protocol standard to the second cellular communication protocol standard at 420 and, at 425, waits until the handover is complete. In response to the handover completion, the modem 410 sends an indication of the handover to the TCP layer 416.

The modem 410 communicates a message directly to the TCP layer 416 indicating the handover completion. A communication channel between the modem of the mobile device and the TCP layer of the mobile device communicates the message. This mode of communication is not present in current communication between layers of mobile devices.

At 430, the TCP layer receives the indication of the cross-technology handover completion and checks whether a download of data to the TCP layer is taking place. At 435, in response to the detection of the download of data and if there is a download in process, the TCP layer 416 initiates transmission of three duplicate acknowledgment (ACK) packets. The three duplicate ACK packets, when received by the remote TCP source, trigger a fast retransmission and recovery at the TCP source. If the TCP layer 416 determines that a download to the TCP layer is not taking place, the TCP layer 416 ignores the indication of the handover.

In response to the transmission of the three duplicate ACK packets, the data transfer is resumed immediately at the remote TCP source, and the TCP layer 416 of the mobile device receives retransmitted data from the TCP source. Thus, the mobile device does not have to wait for a complete timeout of the RTO timer of the TCP source. The retransmission from the TCP source can begin as soon as possible with minimal delay, and the TCP deadlock is resolved as soon as the handover is completed.

Figure 5:
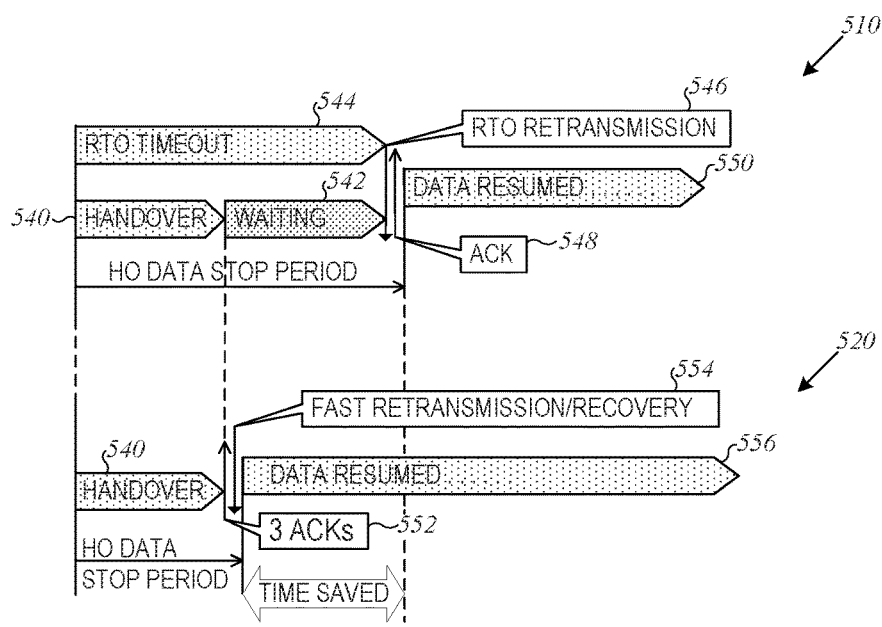
FIG. 5 is a timing diagram illustrating an embodiment of operation of a mobile device.

FIG. 5 is a timing diagram illustrating an embodiment of operation of a mobile device without handover recovery indicated generally at 510, and with handover recovery indicated generally at 520. At 540, a handover between communication technologies occurs, such as by any of the examples described previously herein. Without handover recovery as in 510, the TCP data transfer stops and waits until the remote TCP retransmission time out (RTO) 544 and sends out the retransmission data packet. The mobile device and the TCP source are each waiting 542 for the RTO 544 to complete in order to proceed. Responsive to the RTO 544, retransmission 546 begins, the mobile device sends one ACK packet at 548, and data transfer is resumed at 550.

With handover recovery 520, the mobile device sends three duplicate ACK packets in response to the handover 540 complete event. This results in faster recovery and earlier retransmission at 554. The data transfer 556 is resumed, the handover stop period is reduced, and much of the waiting period 542 is avoided because the RTO is not used to determine when download of data can be resumed. In the example of FIG. 5, it is assumed that the handover can complete before the timer times out.

Figure 6:
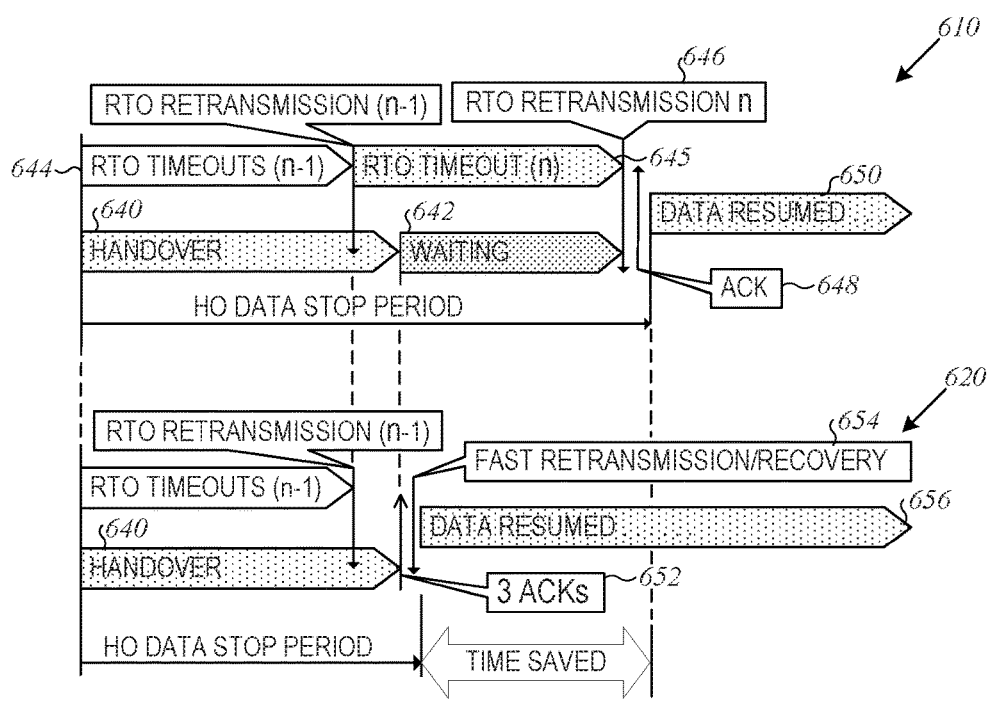
FIG. 6 is a timing diagram illustrating another embodiment of operation of a mobile device.

FIG. 6 is a timing diagram illustrating another embodiment of operation of a mobile device without handover recovery at 610 and with handover recovery at 620. As in the example of FIG. 5, a handover between communication technologies occurs at 640. However, in this example the handover takes longer than the timeout for retransmission RTO 644. The RTO timer may perform n−1 RTO timeouts, where n≥2. The remote TCP source sends out one retransmission data packet for each RTO timeout during the handover period. Because the handover is not complete, the RTO retransmission(s) during the handover period cannot reach the local TCP server in the mobile device. Only the last RTO retransmission data packet after the handover reaches the local TCP on the device. Thus a second round of RTO 645 begins. Without handover recovery, the device will wait 642 to receive the nth RTO retransmission data packet and responds with the ACK packet. The data transfer then resumes at 650.

The mobile device with handover recovery 620 sends the three duplicate ACK packets in response to the handover 640 completing; allowing for fast recovery and retransmission at 654, and data transfer 656 is resumed and again most of the waiting period 642 is avoided.

The several devices and methods described herein provide for communication technology handovers with minimal delay experienced by the user.

ADDITIONAL DESCRIPTION AND EXAMPLES

Example 1 can include subject matter (such as a system for communication via a cellular communication network) comprising: a transport control protocol (TCP) source device; and a mobile device including: physical layer circuitry including a transceiver configured to communicate information via the cellular communication network; a modem of the mobile device configured to: control communication according to a first cellular communication protocol standard; detect a change in the communication to a second cellular communication protocol standard different from the first cellular communication protocol standard; and communicate an indication of completion of the change in the cellular communication protocol standard; and a TCP layer of the mobile device configured to initiate transmission of three duplicate acknowledgment (ACK) packets to the TCP source device in response to receiving the indication of completion of the change in the cellular communication protocol standard.

In Example 2, the subject matter of Example 1 optionally includes a modem configured to communicate according to a long term evolution (LTE) communication protocol standard as the first cellular communication protocol standard, and communicate according to a second cellular communication protocol standard that includes one of Wideband Code Division Multiple Access (WCDMA), CDMA Evolution-Data Optimized (CDMA EVDO), CDMA-1x, a general packet radio service (GPRS), or an enhanced GPRS (EDGE).

In Example 3, the subject matter of Example 1 optionally includes the first cellular communication protocol standard including one of WCDMA, CDMA EVDO, CDMA-1x, GPRS, or EDGE, and the second cellular communication protocol includes an LTE communication protocol standard.

In Example 4, the subject matter of one or any combination of Examples 1-3 optionally includes a modem configured to detect a change in communication between a communication protocol standard that includes WCDMA and a communication protocol standard that includes one of GPRS or EDGE, and communicate an indication of completion of the change in the communication protocol standard. The change in communication protocol may be from WCDMA to GPRS or EDGE, or the change may be from GPRS or EDGE to WCDMA.

In Example 5, the subject matter of one or any combination of Examples 1-4 optionally includes a modem configured to detect a change in communication between a communication protocol standard that includes CDMA EVDO and a communication protocol standard that includes CDMA-1x, and communicate an indication of completion of the change in the communication protocol standard. The change in communication protocol may be from CDMA EVDO to CDMA-1x, or the change may be from CMDA-1x to CDMA EVDO.

In Example 6, the subject matter of one or any combination of Examples 1-5 optionally includes a modem configured to detect a handover completion from the first cellular communication protocol standard to the second cellular communication protocol standard and send a message indicating a cross-technology handover completion directly to the TCP layer; and a TCP layer configured to initiate consecutive transmission of the three duplicate ACK packets in response to the message indicating the handover completion.

In Example 7, the subject matter of one or any combination of Examples 1-6 optionally includes a modem configured to communicate an indication of handover completion to the TCP layer indicating completion of the first cellular communication protocol standard to the second cellular communication protocol standard, and a TCP layer configured to initiate the transmission of the three ACK packets in response to receiving the indication of handover completion during a download of data to the TCP layer, and to ignore the indication of handover completion otherwise.

In Example 8, the subject matter of one or any combination of Examples 1-7 optionally includes a TCP layer of the mobile device configured to receive retransmitted data from a remote TCP source in response to the transmission of the three duplicate ACK packets.

Example 9 can include subject matter (such as a method of operating an ambulatory medical device, a means for performing acts, or a machine-readable medium including instructions that, when performed by the machine, cause the machine to perform acts), or can optionally be combined with the subject matter of one or any combination of Examples 1-8 to include such subject matter, comprising communicating information via a cellular communication network using a first cellular communication protocol standard; detecting, by a modem of the mobile device, a change in the communication to a second cellular communication protocol standard different from the first cellular communication protocol standard; communicating, from the modem to a TCP layer of the mobile device, an indication of completion of the change in the cellular communication protocol standard; and initiating, by the TCP layer in response to the indication of completion, transmission of three duplicate ACK packets.

In Example 10, the subject matter of Example 9 optionally includes the first cellular communication protocol standard includes an LTE communication protocol standard, and the second cellular communication protocol standard includes one WCDMA, CDMA EVDO, CDMA-1×, GPRS, or EDGE.

In Example 11, the subject matter of Example 9 optionally includes the first cellular communication protocol standard including WCDMA and the second cellular communication protocol standard including one of GPRS or EDGE.

In Example 12, the subject matter of Example 9 optionally includes the first cellular communication protocol standard including one of GPRS or EDGE and the second cellular communication protocol standard including WCDMA.

In Example 13, the subject matter of Example 9 optionally includes the first cellular communication protocol standard includes CDMA EVDO and the second cellular communication protocol standard includes CDMA-1×.

In Example 14, the subject matter of Example 9 optionally includes the first cellular communication protocol standard includes CDMA-1× and the second cellular communication protocol standard includes CDMA EVDO.

In Example 15, the subject matter of Example 9 optionally includes the first cellular communication protocol standard includes one of WCDMA, CDMA EVDO, CDMA-1×, GPRS, or EDGE, and the second cellular communication protocol includes an LTE communication protocol standard.

In Example 16, the subject matter of one or any combination of Examples 9-15 optionally includes the indication of completion of the change in the cellular communication protocol standard including an indication of cross-technology handover completion, and wherein the initiating transmission of the three duplicate ACK packets optionally includes the TCP layer initiating the transmission of the three duplicate ACK packets when receiving the indication of handover completion during a download of data to the TCP layer, and ignoring the indication of handover completion otherwise.

In Example 17, the subject matter of one or any combination of Examples 9-16 optionally includes receiving retransmission data from a remote TCP server in response to the transmission of the three duplicate ACK packets.

In Example 18, the subject matter of one or any combination of Examples 9-17 optionally includes the modem layer communicating a message directly to the TCP layer that indicates completion of a handover in communication from the first cellular communication protocol standard to the second cellular communication protocol standard.

Example 19 can include subject matter (such as a computer readable storage medium including instructions that, when executed by processing circuitry of a mobile device of a cellular communication network, cause the mobile device to perform specified operations), or can optionally be combined with the subject matter of one or any combination of Examples 1-18 to include such subject matter comprising a computer readable storage medium including instructions to cause processing circuitry to communicate information via a cellular communication network using a first cellular communication protocol standard; detect, using a modem of the mobile device, a change in the communication to a second cellular communication protocol standard different from the first cellular communication protocol standard; communicate, from the modem to a TCP layer of the mobile device, an indication of completion of the change in the cellular communication protocol standard; and initiate, by the TCP layer in response to the indication of completion, transmission of three duplicate ACK packets.

In Example 20, the subject matter of Example 19 includes instructions to cause the processing circuitry of the mobile device to communicate an indication of cross-technology handover completion as the indication of completion of the change in the cellular communication protocol standard; initiate the transmission of the three duplicate ACK packets when receiving the indication of handover completion during a download of data to the TCP layer; and ignore the indication of handover completion otherwise.

Example 21 can include, or can optionally be combined with any portion or combination of any portions of any one or more of Examples 1-20 to include, subject matter that can include means for performing any one or more of the functions of Examples 1-20, or a machine-readable medium including instructions that, when performed by a machine, cause the machine to perform any one or more of the functions of Examples 1-20.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A system for communication via a cellular communication network, the system comprising:
   a transport control protocol (TCP) source device; and
   a mobile device including:
   a modem including a transceiver configured to communicate information via the cellular communication network;
   a processing circuitry executing instructions stored in a memory;
   the modem of the mobile device configured to:
   control communication according to a first cellular communication protocol standard;
   detect a change in the communication to a second cellular communication protocol standard different from the first cellular communication protocol standard; and
   communicate an indication of handover completion to a TCP layer in response to completion of the change in the cellular communication protocol standard; and
   wherein the TCP layer configured to initiate transmission of three duplicate acknowledgment (ACK) packets to the TCP source device immediately, in response to receiving the indication of handover completion from the modem during a download of data to the TCP layer and to ignore the indication of handover completion otherwise.

2. The system of claim 1, wherein the modem is configured to communicate according to a long term evolution (LTE) communication protocol standard as the first cellular communication protocol standard, and communicate according to a second cellular communication protocol standard that includes one of Wideband Code Division Multiple Access (WCDMA), CDMA Evolution-Data Optimized (CDMA EVDO), CDMA-1x, a general packet radio service (GPRS), or an enhanced GPRS (EDGE).

3. The system of claim 1, wherein the first cellular communication protocol standard includes one of WCDMA, CDMA EVDO, CDMA-1x, GPRS, or EDGE, and the second cellular communication protocol includes an LTE communication protocol standard.

4. The system of claim 1, wherein the modem is configured to detect a change of communication protocol standard between a communication protocol standard that includes WCDMA and a communication protocol standard that includes one of GPRS or EDGE, and communicate an indication of completion of the change in the communication protocol standard.

5. The system of claim 1, wherein the modem is configured to detect a change of communication protocol standard between a communication protocol standard that includes CDMA EVDO and a communication protocol standard that includes CDMA-1x, and communicate an indication of completion of the change in the communication protocol standard.

6. The system of claim 1, wherein the modem is configured to communicate the indication of handover completion to the TCP layer when the first cellular communication protocol standard does not supports packetized voice data and the second cellular communication protocol standard supports packetized data.

7. The system of claim 1, wherein the TCP layer of the mobile device is configured to receive retransmitted data from a remote TCP source in response to the transmission of the three duplicate ACK packets.

8. A method of operating a mobile device, the method comprising:
   communicating information via a cellular communication network using a first cellular communication protocol standard;
   detecting, by a modem of the mobile device, a change in the communication to a second cellular communication protocol standard different from the first cellular communication protocol standard;
   communicating, from the modem to a TCP layer of the mobile device, an indication of handover completion to the TCP layer in response to completion of the change in the cellular communication protocol standard; and
   initiating, by the TCP layer, transmission of three duplicate acknowledgment (ACK) packets to the TCP source device immediately, in response to receiving the indication of handover completion from the modem during a download of data to the TCP layer and to ignore the indication of handover completion otherwise.

9. The method of claim 8, wherein the first cellular communication protocol standard includes an LTE communication protocol standard, and the second cellular communication protocol standard includes one WCDMA, CDMA EVDO, CDMA-1x, GPRS, or EDGE.

10. The method of claim 8, wherein the first cellular communication protocol standard includes WCDMA and the second cellular communication protocol standard includes one of GPRS or EDGE.

11. The method of claim 8, wherein the first cellular communication protocol standard includes one of GPRS or EDGE and the second cellular communication protocol standard includes WCDMA.

12. The method of claim 8, wherein the first cellular communication protocol standard includes CDMA EVDO and the second cellular communication protocol standard includes CDMA-1x.

13. The method of claim 8, wherein the first cellular communication protocol standard includes CDMA-1x and the second cellular communication protocol standard includes CDMA EVDO.

14. The method of claim 8, wherein the first cellular communication protocol standard includes one of WCDMA, CDMA EVDO, CDMA-1x, GPRS, or EDGE, and the second cellular communication protocol includes an LTE communication protocol standard.

15. The method of claim 8, wherein the communicating the indication of handover completion includes communicating the indication of handover completion when the change in the cellular communication standard includes circuit switch fall back.

16. The method of claim 15, further including receiving retransmission data from a remote TCP server in response to the transmission of the three duplicate ACK packets.

17. A non transitory computer readable storage medium including instructions that, when executed by processing circuitry of a mobile device of a cellular communication network, cause the mobile device to:
   communicate information via a cellular communication network using a first cellular communication protocol standard;

detect, using a modem of the mobile device, a change in the communication to a second cellular communication protocol standard different from the first cellular communication protocol standard;

communicate, from the modem to a TCP layer of the mobile device, an indication of handover completion to the TCP layer in response to completion of the change in the cellular communication protocol standard; and initiate, by the TCP layer, transmission of three duplicate acknowledgment (ACK) packets to the TCP source device immediately, in response to receiving the indication of handover completion from the modem during a download of data to the TCP layer and to ignore the indication of handover completion otherwise.

18. The non-transitory computer readable storage medium of claim 17, including instructions that cause the mobile device to:

communicate the indication of cross-technology handover completion;

when the change in the cellular communication standard includes circuit switch fall back.

\* \* \* \* \*

UNITED STATES PATENT AND TRADEMARK OFFICE
CERTIFICATE OF CORRECTION

PATENT NO. : 9,986,468 B2  
APPLICATION NO. : 15/074475  
DATED : May 29, 2018  
INVENTOR(S) : Yu et al.

Page 1 of 1

It is certified that error appears in the above-identified patent and that said Letters Patent is hereby corrected as shown below:

In the Claims

In Column 12, Line 1, in Claim 6, delete "supports" and insert --support-- therefor In Column 12, Line 61, in Claim 17, delete "non transitory" and insert --non-transitory-- therefor In Column 13, Line 19, in Claim 18, delete "completion;¶" and insert --completion-- therefor Signed and Sealed this  
Eighth Day of December, 2020

Andrei Iancu  
*Director of the United States Patent and Trademark Office*